(12) United States Patent
Isgar

(10) Patent No.: US 12,574,702 B2
(45) Date of Patent: *Mar. 10, 2026

(54) SYSTEM FOR ANONYMOUS DATA GATHERING AND REPORTING CORRESPONDING TO SELECTED GEOGRAPHIC AREAS

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 51 days.

This patent is subject to a terminal disclaimer.

(21) Appl. No.: 18/425,002

(22) Filed: Jan. 29, 2024

(65) Prior Publication Data

US 2024/0171937 A1 May 23, 2024

Related U.S. Application Data

(63) Continuation of application No. 17/562,566, filed on Dec. 27, 2021, now Pat. No. 11,889,378, which is a continuation of application No. 17/201,883, filed on Mar. 15, 2021, now Pat. No. 11,212,640.

(60) Provisional application No. 63/043,393, filed on Jun. 24, 2020.

(51) Int. Cl.
*H04W 4/021* (2018.01)

(52) U.S. Cl.
CPC ..................................... *H04W 4/021* (2013.01)

(58) Field of Classification Search
CPC .............. G06Q 50/01; G06Q 30/0241; G06Q 20/3224; G06Q 20/384; G06Q 30/0255; G06Q 30/0203; G06Q 30/0205; H04W 4/02; H04W 4/021; H04W 4/022; H04W 4/30
See application file for complete search history.

(56) References Cited

U.S. PATENT DOCUMENTS

| | | | |
|---|---|---|---|
| 10,582,333 B2 * | 3/2020 | Jones ................. | G08B 13/1965 |
| 2003/0083073 A1 | 5/2003 | Cossins et al. | |
| 2008/0305808 A1 | 12/2008 | Chan et al. | |
| 2010/0197318 A1 | 8/2010 | Petersen et al. | |
| 2011/0238300 A1 * | 9/2011 | Schenken .............. | G06Q 10/08 |
| | | | 701/408 |
| 2013/0148531 A1 | 6/2013 | Moisan et al. | |
| 2013/0198281 A1 | 8/2013 | Scuba et al. | |
| 2014/0121958 A1 * | 5/2014 | Schenken ............ | G07C 5/0866 |
| | | | 701/408 |
| 2015/0111524 A1 | 4/2015 | South | |
| 2016/0205512 A1 | 7/2016 | Petersen et al. | |
| 2016/0255603 A1 | 9/2016 | Venkatraman et al. | |
| 2016/0255604 A1 * | 9/2016 | Venkatraman ...... | G01S 5/02524 |
| | | | 455/456.1 |

(Continued)

FOREIGN PATENT DOCUMENTS

| | | | | |
|---|---|---|---|---|
| WO | WO-2014118534 A1 * | 8/2014 | .............. | H04W 4/90 |
| WO | WO-2016064624 A1 * | 4/2016 | ............ | H04W 4/023 |

*Primary Examiner* — Mong-Thuy T Tran
(74) *Attorney, Agent, or Firm* — Schmeiser, Olsen & Watts LLP

(57) ABSTRACT

Described is a data gathering zone system. The system includes a server having a memory for storing area information and a user computing device coupled to the server. The system may operate to allow a user to define a zone around a geographic area to establish a data zone. Mobile device signals that occur within the data zone are collected and aggregated by the server. The server may generate for display the gathered data within the geofenced zone for analysis.

15 Claims, 10 Drawing Sheets

(56)                 References Cited

U.S. PATENT DOCUMENTS

| | | |
|---|---|---|
| 2016/0261984 A1 | 9/2016 | Shrinath |
| 2016/0277895 A1* | 9/2016 | Scuba ................. H04L 63/0421 |
| 2018/0176726 A1 | 6/2018 | Beal |
| 2018/0213359 A1 | 7/2018 | Reinhardt et al. |
| 2018/0253082 A1 | 9/2018 | Asenjo et al. |
| 2019/0174289 A1 | 6/2019 | Martin et al. |
| 2020/0053511 A1* | 2/2020 | Yamazaki ............. H04W 4/029 |
| 2020/0349608 A1* | 11/2020 | Liang ................. G06Q 30/0261 |
| 2021/0136518 A1* | 5/2021 | Borras ................... H04W 4/20 |

* cited by examiner

20

20

20

SYSTEM FOR ANONYMOUS DATA GATHERING AND REPORTING CORRESPONDING TO SELECTED GEOGRAPHIC AREAS

CROSS REFERENCE TO RELATED APPLICATION[S]

This application is a continuation of U.S. patent application entitled "Data Gathering Zone System," Ser. No. 17/562,566, filed Dec. 27, 2021, which is a continuation of U.S. patent application entitled "Data Gathering Zone System," Ser. No. 17/201,883, filed Mar. 15, 2021, now U.S. Pat. No. 11,212,640, issued Dec. 28, 2021, which claims priority to U.S. Provisional Patent Application entitled "Data Gathering Zone System," Ser. No. 63/043,393, filed Jun. 24, 2020, the disclosure of which is hereby incorporated entirely herein by reference.

BACKGROUND OF THE INVENTION

Technical Field

This invention generally relates to a system for data gathering, and more specifically to a system for gathering data regarding an area utilizing a geofence.

State of the Art

There are several instances where an individual or business entity would desire to gather data regarding certain areas. For example, gathering information regarding the number of customers going into a competitor's business, gathering information regarding number of people within an area, and the like. There is not currently a system that allows for tracking data regarding an area based on geofence technology.

Accordingly, what is needed is a system for gathering data regarding an area utilizing geofence or other proximity technology allowing for creating a zone used for remote, automatic and anonymous gathering of information.

SUMMARY OF THE INVENTION

An embodiment includes a data gathering zone system comprising: a server having a memory for storing area information; and a user computing device coupled to the server, wherein the server is programmed to: receive and process a signal that the user computing device has accessed the system and is searching for an area to gather data about; send for display on the user computing device area information comprising a map of the searched area; receive and process a signal from the user computing device comprising a user defined zone on the map displayed on the user computing device; automatically generate a data gathering zone corresponding to the user defined zone; establish a geofence corresponding to the data gathering zone; and gather and aggregate the data regarding each mobile device that sends a cellular signal while within the geofence of the data gathering zone.

The user computing device may be a mobile computing device. The gathering may be remote. The gathering may be automatic. The gathering may be anonymous. The area information may comprise a geographic area. The geographic area may be selected from a group consisting of a business, a city or town, a park, a medical facility, a venue and/or a location along a street. The server may generate for display on the user computing device the gathered and aggregated data within the geofence. The server may generate for display on the user computing device a number of the mobile devices within the data gathering zone over particular time periods throughout a day. The system may adjust a counter up or down based on whether the mobile device enters or leaves the data gathering zone.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Embodiments of the present invention relate to a data gathering zone system for utilizing a geofence or other proximity technology allowing for creating a zone used for remote, automatic and anonymous gathering of information. The system may include the use of a user computing device that may be a mobile computing device such as a smartphone, a tablet, a wearable, and the like; and/or the system may operate on any type of computing device as a downloadable application or even as a web application.

Figure 1:
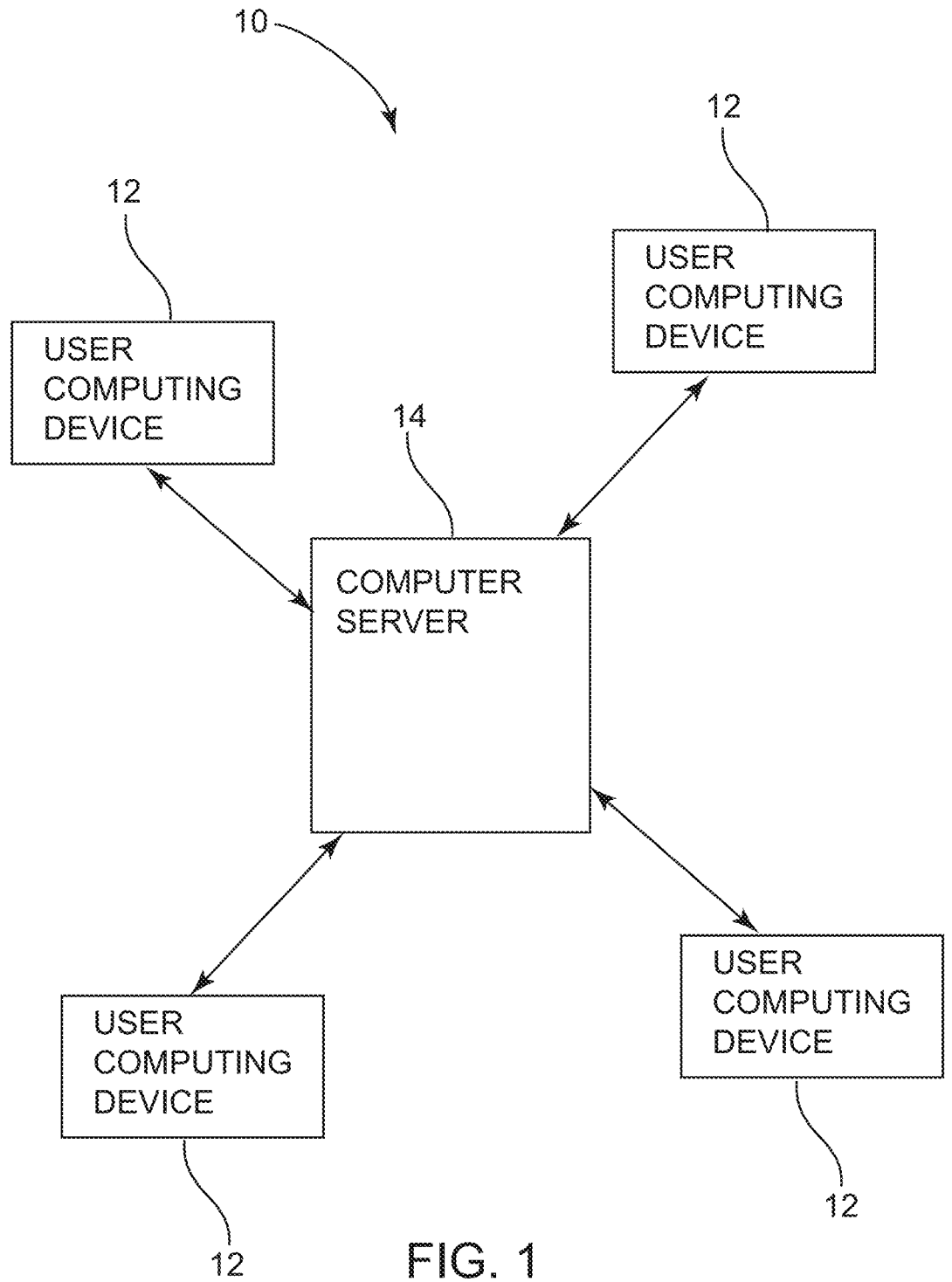
FIG. 1 a diagrammatic view of a first part of a data gathering zone system according to an embodiment.
Figure 2:
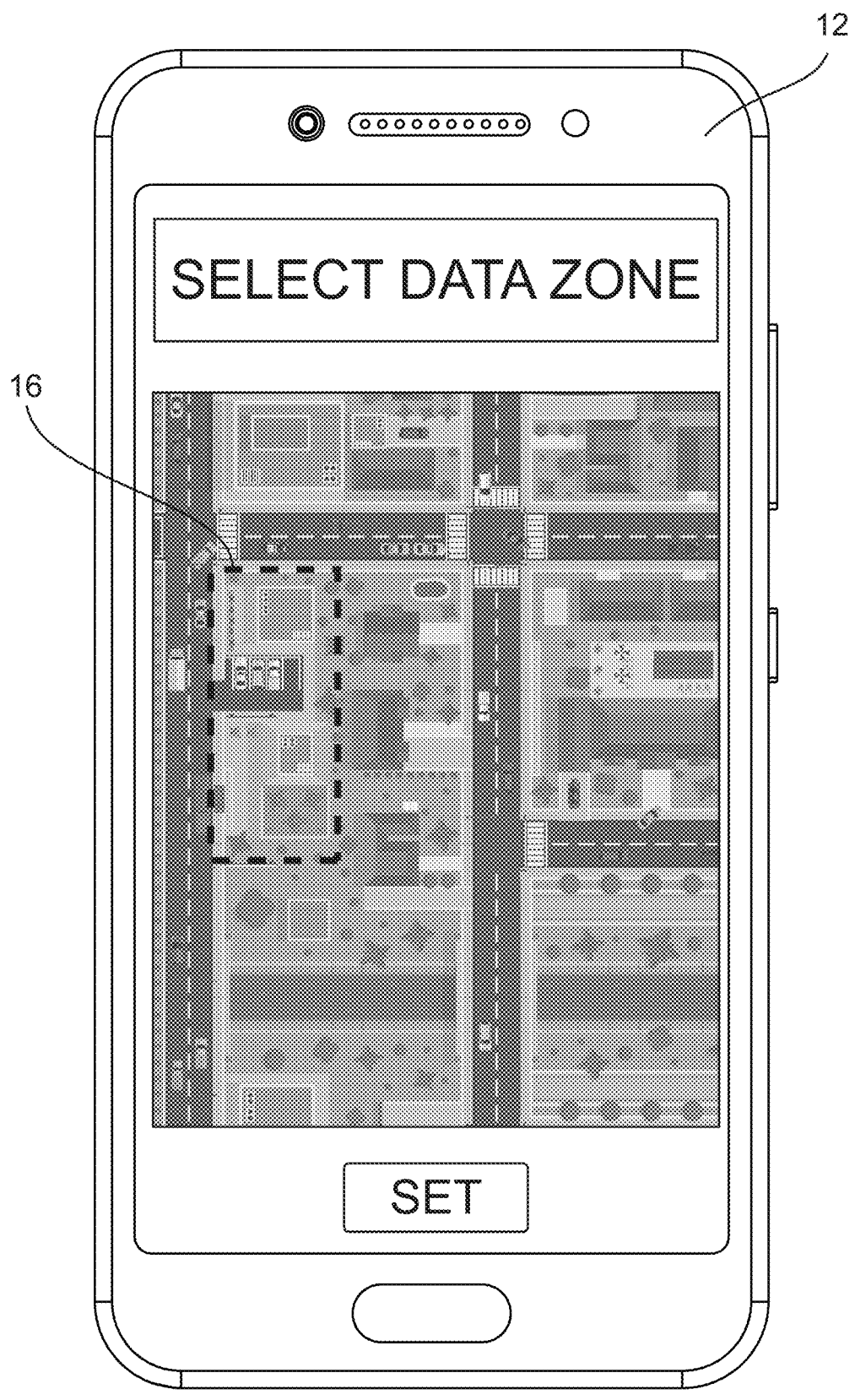
FIG. 2 is a view of a user interface for interaction with a data gathering zone to select a user determined zone using the system according to an embodiment.
Figure 3:
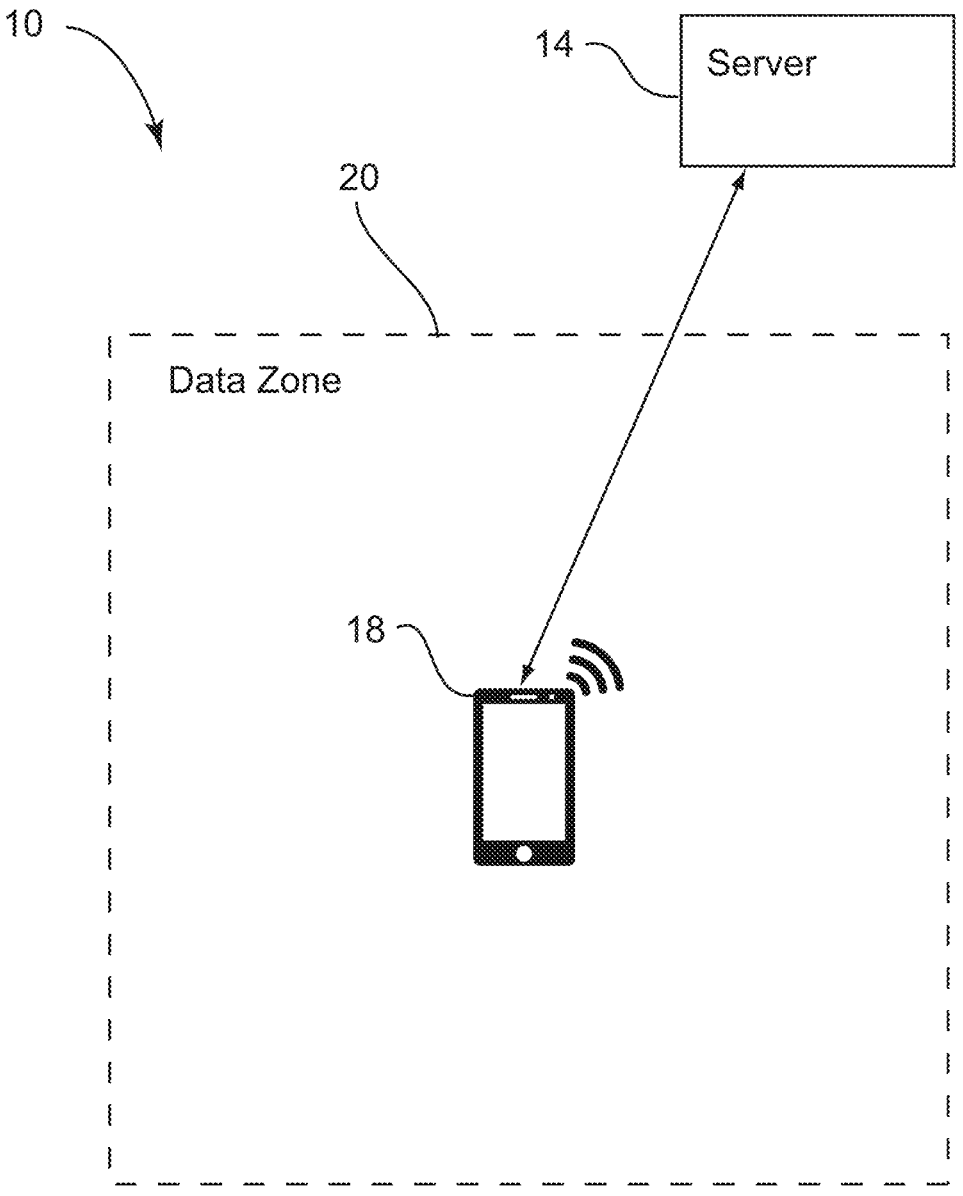
FIG. 3 a diagrammatic view of a second part of a data gathering zone system according to an embodiment.
Figure 4:
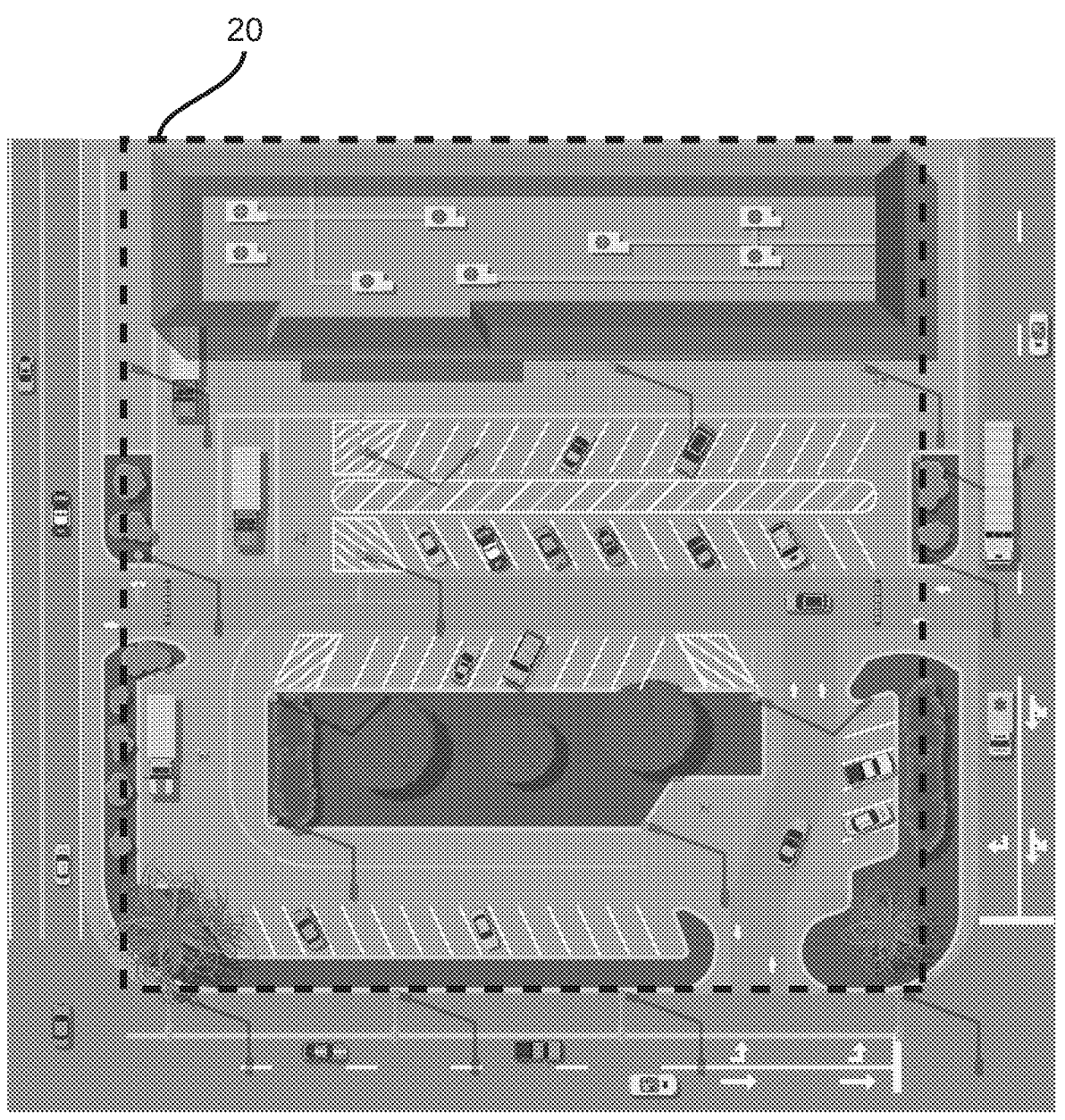
FIG. 4 is a view of a data zone around a business using a data gathering zone system according to an embodiment.
Figure 5:
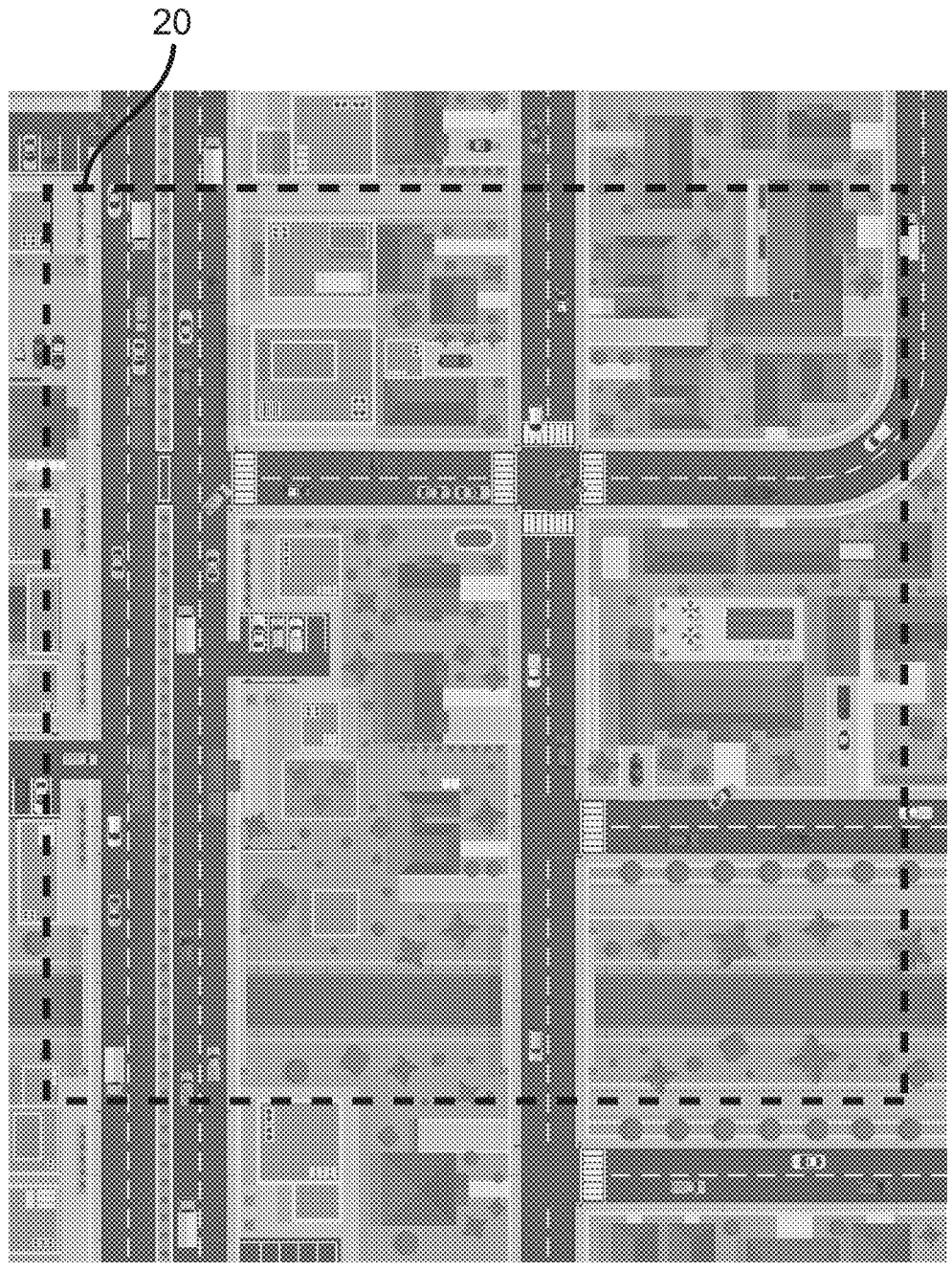
FIG. 5 is another view of a data zone around a portion of a city/town using a data gathering zone system according to an embodiment.
Figure 6:
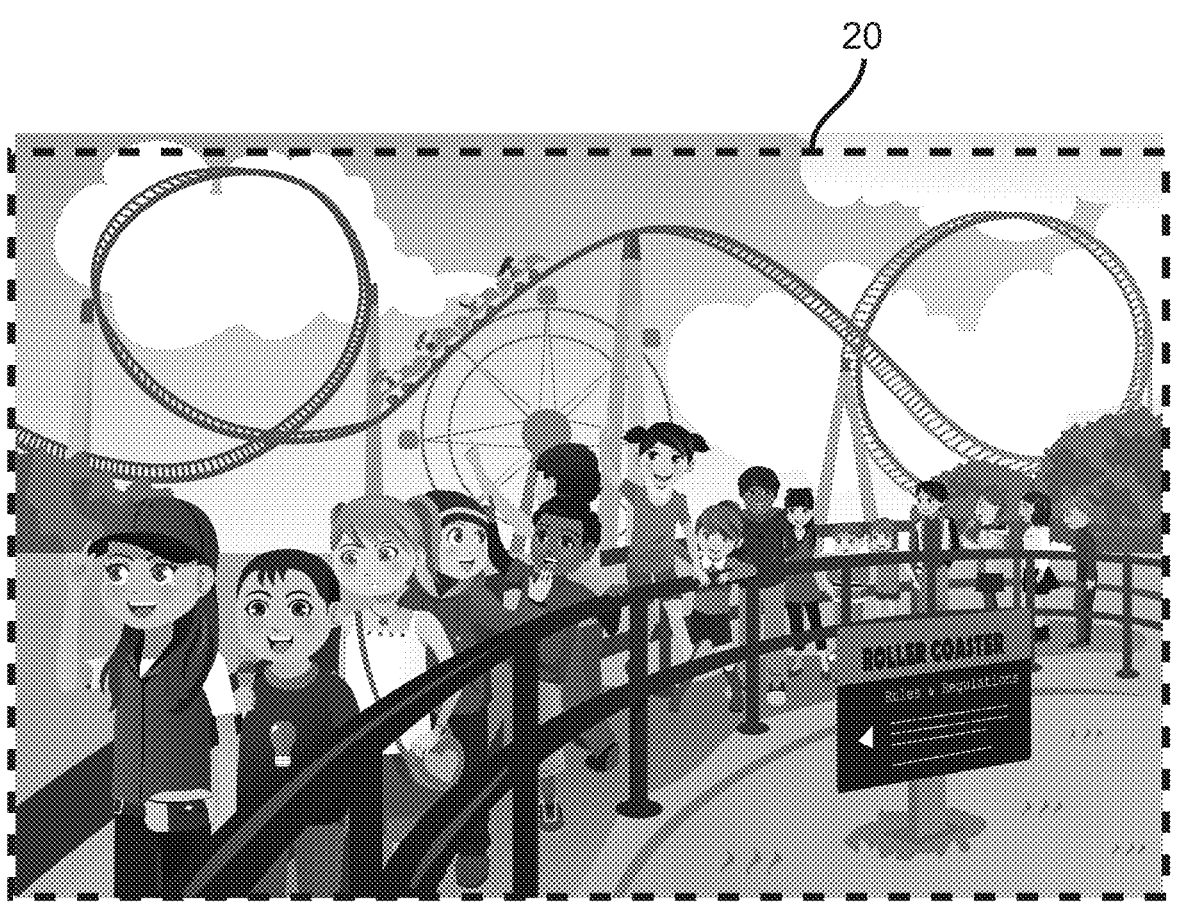
FIG. 6 is another view of a data zone around an amusement park using a data gathering zone system according to an embodiment.
Figure 7:
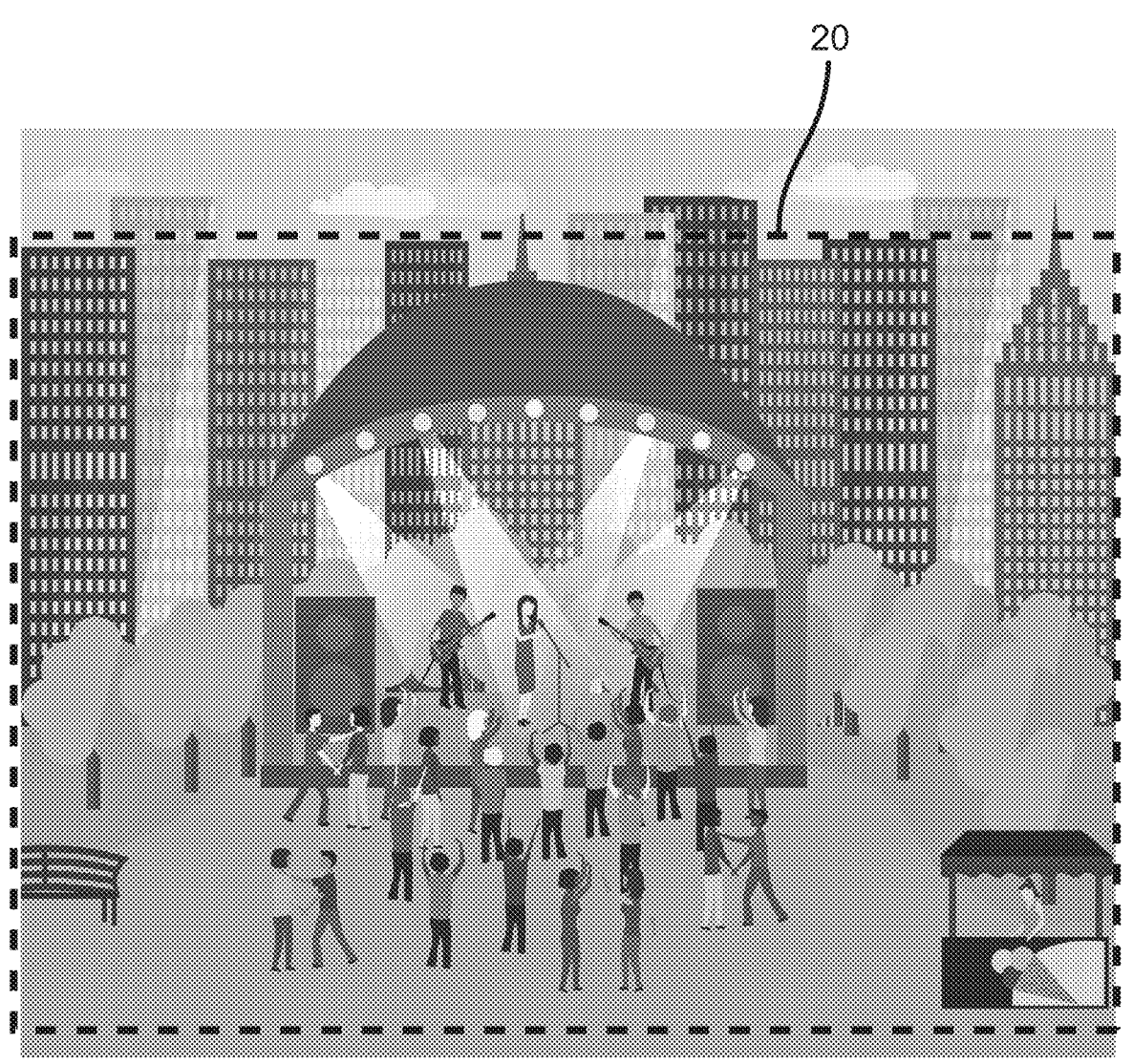
FIG. 7 is another view of a data zone around a music festival using a data gathering zone system according to an embodiment.
Figure 8:
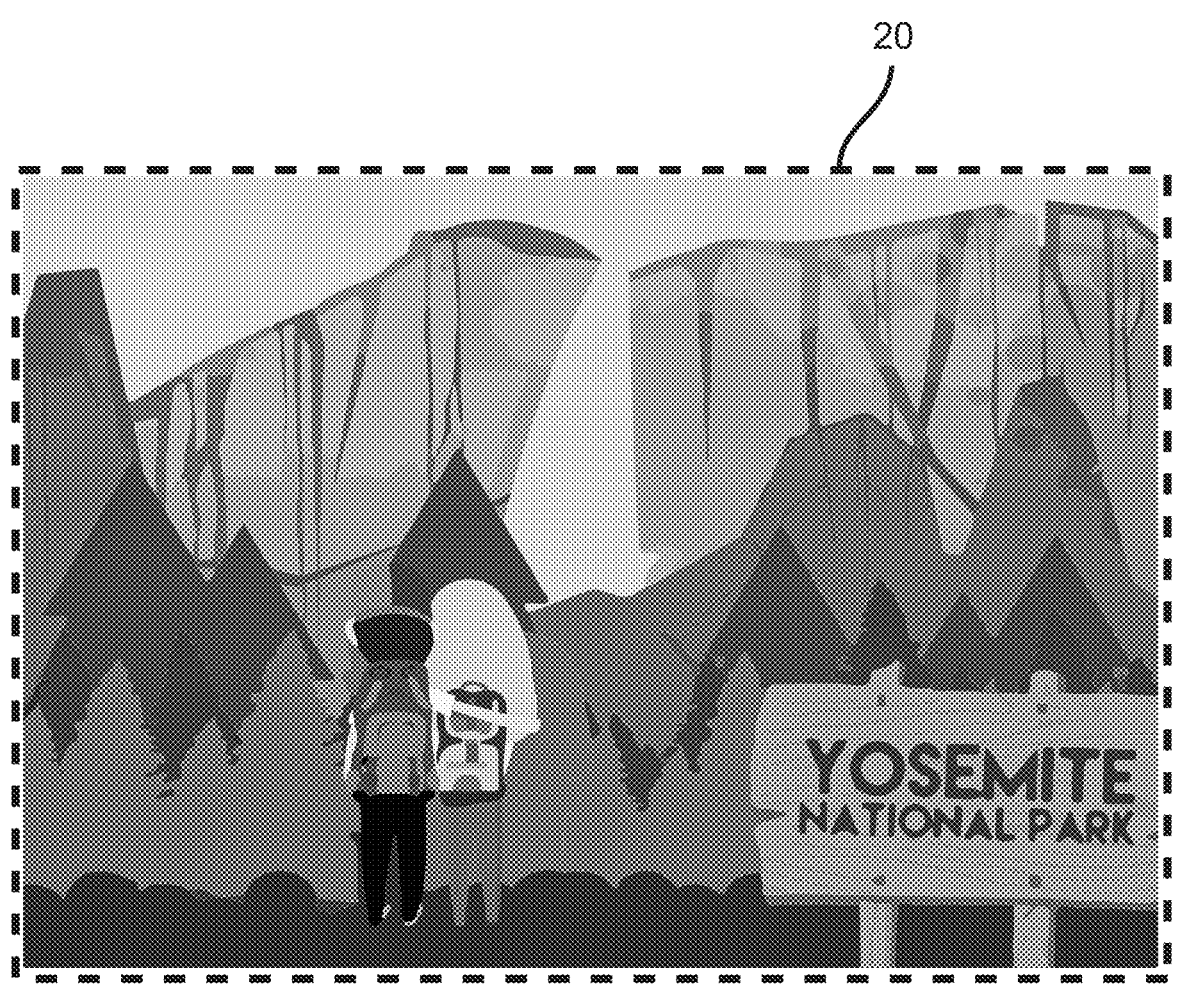
FIG. 8 is another view of a data zone around a national park using a data gathering zone system according to an embodiment.

FIG. 1 depicts an embodiment of a data gathering zone system 10. The system 10 may include user computing devices 12 and a server 14, wherein each user computing device 12 is coupled to the computer server 14. This coupling may be a network connection, such as a wireless connection through an Internet connection, a Wi-Fi connection, a Bluetooth connection or the like, wherein the user computing devices 12 may communicate with and receive communication from the server 14. The user computing device 12 may be a desktop computer, a laptop, a tablet, a smartphone, wearable devices and the like. The server 14, in some embodiments, may be a computer server or a cloud-based infrastructure architecture.

The server 14 may include a memory storing various data. The memory of the server 14 may store area information and may further store data zone information that may be reserved. The area information may include a geographic area, such as, but not limited to, a business, a city or town, a park, a medical facility, a venue, a location along a street and the like.

The user computing device 12 may be coupled to the server 14, and, referring to FIGS. 2-8, the server 14 may be programmed to receive and process a signal that a user computing device 12 has accessed the system 10 such as by running a zone gathering data app, website or web app on the user computing device 12, and is searching for an area to gather information about. The server 14 may then be programmed to send for display on the user computing device area information including a map of the searched area (see FIG. 2). The server 14 may also be programmed to receive and process a signal from the user computing device including a user defined zone 16 on the map displayed on the user computing device (See FIG. 2). The server may then be programmed to automatically generate a data gathering zone 20 corresponding to the user defined zone 16 and establish a geofence corresponding to the data gathering zone 20 (see FIG. 3). The server may then be programmed gather and aggregate data regarding each mobile device 18 that sends a cellular signal while within the geofence of the data gathering zone 20 (see FIG. 3). These zones 20 may include a geographic area, such as, but not limited to, a business (FIG. 4), a portion of a city or town (FIG. 5), an amusement park (FIG. 6), a festival (FIG. 7), a national park (FIG. 8), a medical facility, a venue, a location along a street and the like areas with fluctuating numbers of people in the area.

The system may utilize technology to capture individual instances of a cellular signal being sent from within the data zone 20. This allows a user to draw or otherwise designate an area using the system 10 for which they wish to track cell signals within that zone. The system collects the cell signal data automatically. Because the system only determines if a cell signal is present within the zone for each mobile device within the zone and adjusts a counter up or down based on whether a mobile device enters or leaves the zone, it does not collect personal information from the mobile devices. In at least this way, the data is anonymous. The system may be utilized to determine the number of people visiting a business such as a grocery store (FIG. 4) so that the business itself can determine its patronage or by a competitor to see how they compare to the business. It can be used in instances like portions of the city/town or festivals, like music festivals (FIGS. 5 and 7) to see how crowds are gathering for management or other purposes. The system 10 can be used for amusement parks or even national parks (FIGS. 6 and 8) to determine how many visitors are within the park and any given time to determine the best time to visit or if a person wishes to visit.

Figure 9:
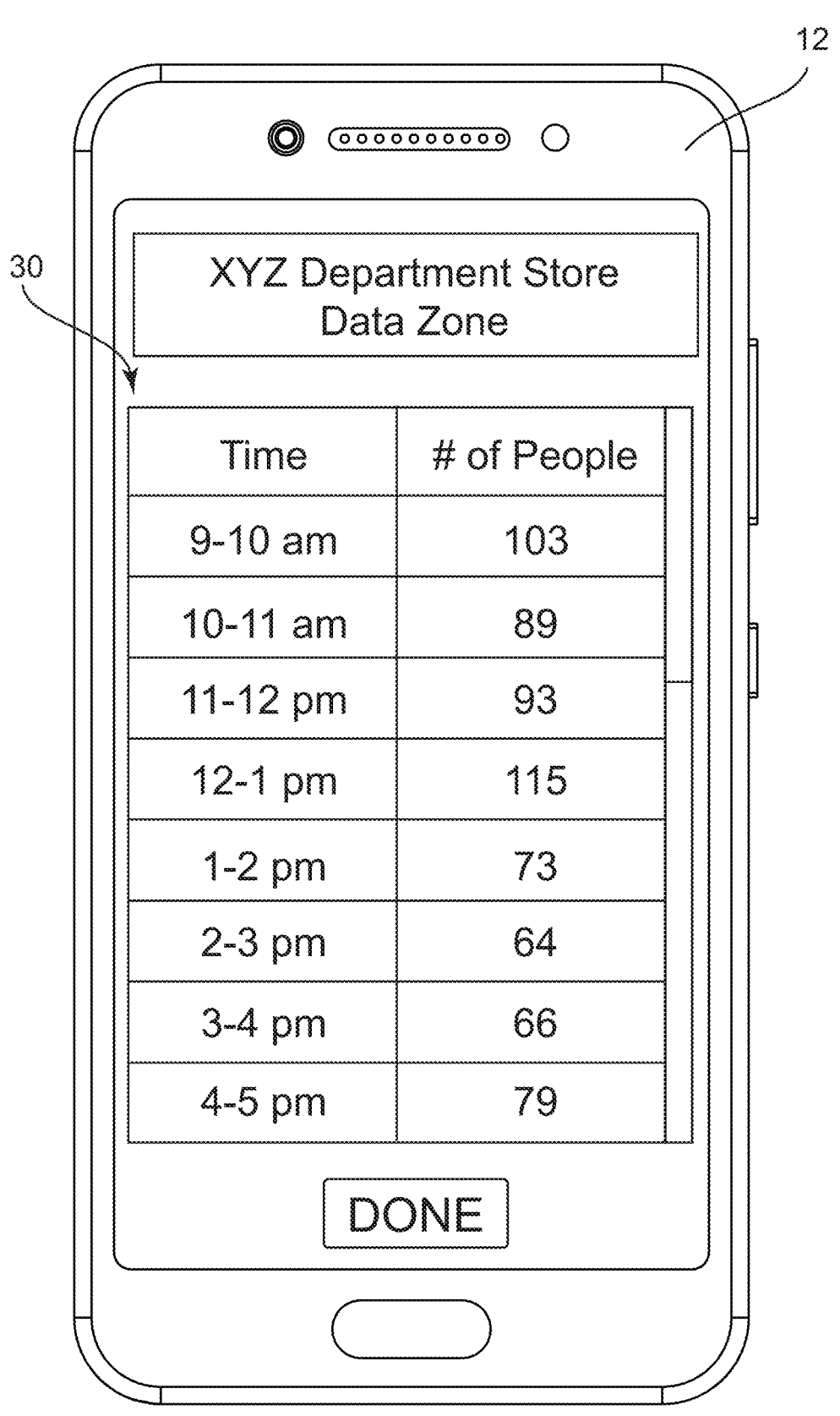
FIG. 9 is a view of a user computing device accessing data from a data gathering zone system according to an embodiment.
Figure 10:
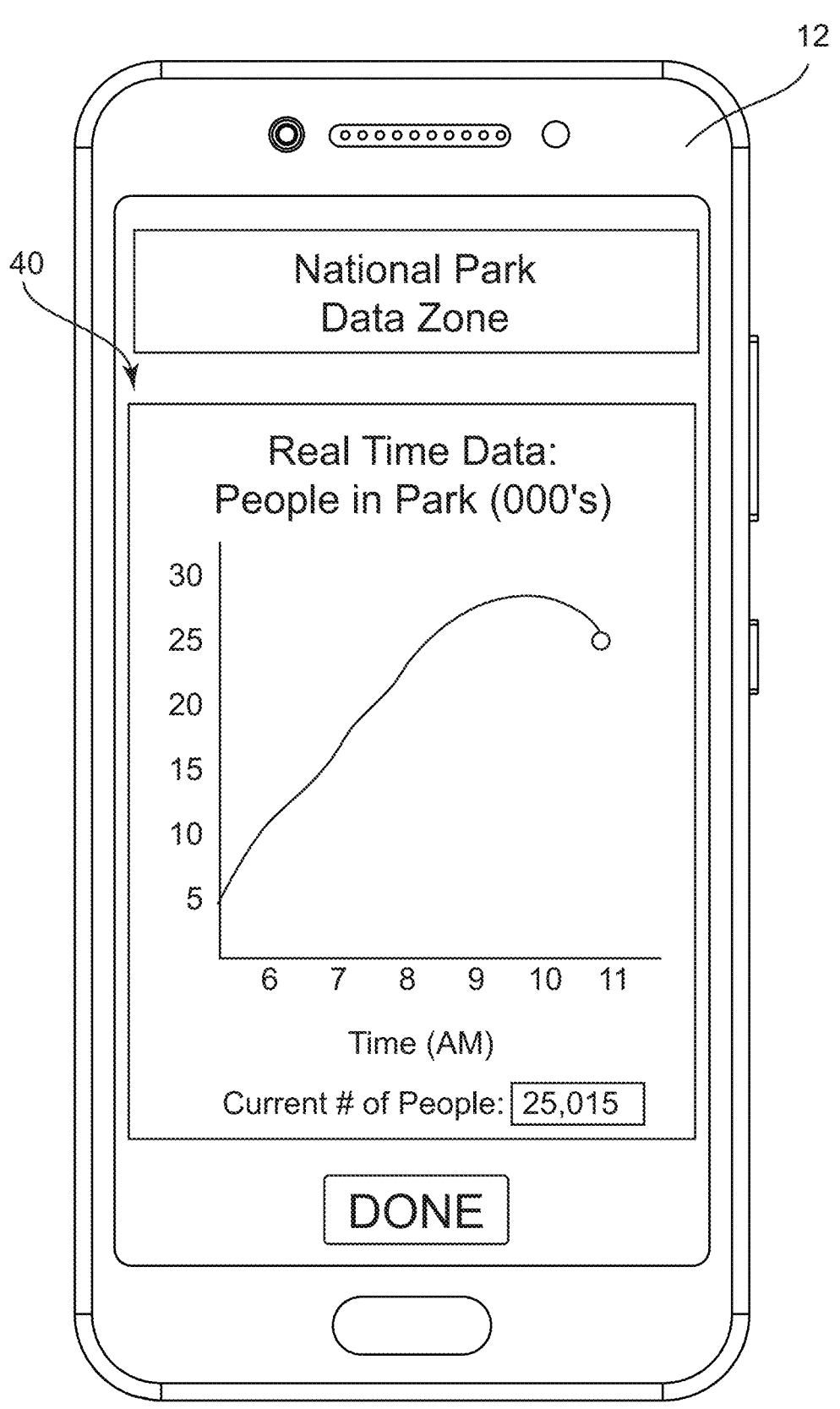
FIG. 10 is a view of a user computing device accessing real-time data from a data gathering zone system according to an embodiment.

The system 10 may include the server 14 programmed to generate and send for display on the user computing device data gathered from within the data zone. For example, and without limitation, the system may display the number of people within the data zone over particular time periods throughout a day. FIG. 9 depicts an embodiment of such a data display wherein the number of people within a store over one hour time periods (which may be any time period selected by either the user or the system) throughout a day. This provides an overview of how many customers are visiting. This data may be aggregated over time and trends may be developed and the data may be searched, parsed and/or organized in various ways for analysis. Another example may be providing real-time data of people within the data zone to display fluctuations in numbers of people within the data zone as it is occurring or shortly thereafter. For example, FIG. 10 depicts a graph showing real-time or near real-time data of the number of people in a national park in a day. With regard to FIGS. 9 and 10, such data may be generated for any type of data zone and utilized in order to analyze and assess current situations regarding numbers of people within the data zone.

Embodiments may be available on or through the internet, such as through domain names reserved and owned by Applicant that include virtual-zones.com, corralthedata-.com, geolasso.com, secretgeo.com or the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A data gathering zone system comprising:
a server having a memory for storing area information; and
a user computing device coupled to the server, wherein the server is programmed to:
receive and process a signal from the user computing device comprising a defined zone;
automatically generate a data gathering zone corresponding to the defined zone;
establish a geofence corresponding to the data gathering zone; and
gather and aggregate anonymized data regarding each mobile device that sends a signal as part of normal mobile device operation while within the geofence of the data gathering zone, wherein the gathering occurs remotely and automatically without requiring any action by users of the mobile devices, and wherein the server is further programmed to count a number of mobile devices that enter the data gathering zone by detecting presence of signals from the mobile devices as part of normal mobile device operation.

2. The data gathering zone system of claim 1, wherein the user computing device is a mobile computing device.

3. The data gathering zone system of claim 1, wherein the area information comprises a map of the searched area.

4. The data gathering zone system of claim 1, wherein the area information comprises a geographic area.

5. The data gathering zone system of claim 4, wherein the geographic area is selected from a group consisting of a business, a city or town, a park, a medical facility, a venue and/or a location along a street.

6. The data gathering zone system of claim 1, wherein the server generates for display on the user computing device the gathered and aggregated data within the geofence.

7. The data gathering zone system of claim 1, wherein the server generates for display on the user computing device a number of the mobile devices within the data gathering zone over particular time periods throughout a day.

8. A data gathering zone system comprising:
a server having a memory for storing area information and gathered and aggregated data; and
a user computing device coupled to the server, wherein the server is programmed to:
receive and process a signal from the user computing device comprising a defined zone;
automatically generate a data gathering zone corresponding to the defined zone; and generate for display on the user computing device a number of mobile devices within the data gathering zone during a particular period of time, wherein the number of mobile devices within the data gathering zone is determined by the gathered and aggregated data stored on the server comprising each mobile device that sends a signal as part of normal mobile device operation while within the data gathering zone, wherein the gathering occurs remotely and automatically without requiring any action by users of the mobile devices, wherein the the gathered data is anonymized, and wherein the server is further programmed to count a number of mobile devices that enter the data gathering zone during a predetermined time period by detecting presence of signals from the mobile devices as part of normal mobile device operation.

9. The data gathering zone system of claim 8, wherein the area information comprises a map of the searched area.

10. The data gathering zone system of claim 8, wherein the area information comprises a geographic area.

11. The data gathering zone system of claim 10, wherein the geographic area is selected from a group consisting of a business, a city or town, a park, a medical facility, a venue and/or a location along a street.

12. A data gathering zone system comprising:
a server having a memory for storing area information and gathered and aggregated data; and
a user computing device coupled to the server, wherein the server is programmed to:
gather and aggregate data regarding each mobile device that sends a signal as part of normal mobile device operation while within a geographic area, wherein the gathering occurs remotely and automatically without requiring any action by users of the mobile devices;
receive and process a signal from the user computing device comprising a defined zone;
automatically generate a data gathering zone corresponding to the defined zone, wherein the data gathering zone corresponds to the geographic area; and
generate for display on the user computing device a number of mobile devices within the data gathering zone during a particular period of time, wherein the number of mobile devices within the data gathering zone is determined by the gathered and aggregated data stored on the server comprising each mobile device that sent a signal as part of normal mobile device operation while within the data gathering zone, wherein the gathering is anonymous, and wherein the server is further programmed to count a number of mobile devices that enter the data gathering zone during a predetermined time period by detecting presence of signals from the mobile devices as part of normal mobile device operation.

13. The data gathering zone system of claim 12, wherein the area information comprises a map of the searched area.

14. The data gathering zone system of claim 12, wherein the area information comprises a geographic area.

15. The data gathering zone system of claim 14, wherein the geographic area is selected from a group consisting of a business, a city or town, a park, a medical facility, a venue and/or a location along a street.

* * * * *